March 21, 1961 C. K. BIRDSALL ET AL 2,976,456

HIGH FREQUENCY ENERGY INTERCHANGE DEVICE

Filed Nov. 14, 1958 4 Sheets-Sheet 1

CHARLES K. BIRDSALL &
CURTIS C. JOHNSON
INVENTORS
BY
ATTORNEY

HIGH FREQUENCY ENERGY INTERCHANGE DEVICE

Filed Nov. 14, 1958 4 Sheets-Sheet 2

CHARLES K. BIRDSALL &
CURTIS C. JOHNSON
INVENTORS
BY Urban L. Faulkon
ATTORNEY

March 21, 1961 C. K. BIRDSALL ET AL 2,976,456

HIGH FREQUENCY ENERGY INTERCHANGE DEVICE

Filed Nov. 14, 1958 4 Sheets-Sheet 3

CHARLES K. BIRDSALL &
CURTIS C. JOHNSON
INVENTORS

BY Urban H. Faubion

ATTORNEY

HIGH FREQUENCY ENERGY INTERCHANGE DEVICE

Filed Nov. 14, 1958

CHARLES K. BIRDSALL &
CURTIS C. JOHNSON
INVENTORS

BY Urban H. Faubion
ATTORNEY 2,976,456

HIGH FREQUENCY ENERGY INTERCHANGE DEVICE

Charles K. Birdsall, Menlo Park, and Curtis C. Johnson, Rolling Hills, Calif., assignors to General Electric Company, a corporation of New York Filed Nov. 14, 1958, Ser. No. 773,866

14 Claims. (Cl. 315—3.6)

This invention relates to high frequency energy interchange devices which depend upon the interchange of energy between an electron stream and a radio frequency field to generate or amplify radio frequency waves. More particularly, this invention relates to such devices which employ electric and magnetic fields in mutually crossed relationship to support interaction between the electron stream and radio frequency fields.

The particular type of energy interchange device to which the present invention relates is one which utilizes the M-J type interaction described in the co-pending patent application "High Frequency Energy Interchange Device," Serial No. 722,404, filed March 19, 1958, in the name of Charles K. Birdsall and Ward A. Harman and the co-pending application, Serial No. 727,072, filed April 8, 1958, in the name of Charles K. Birdsall and Curtis C. Johnson with the same title. Both of these applications are assigned to the assignee of the present invention.

Traveling-wave magnetrons of the type under consideration include an evacuated envelope which encloses the operating elements of the device. The operating elements generally enclosed by the envelope include a means for producing and directing a stream of electrons along a pre-determined path within the envelope and a transmission line for propagating radio frequency waves and producing electromagnetic waves in interacting relationship with the electron stream. The transmission line normally takes the form of a slow-wave structure so that the component of electromagnetic waves propagated in the direction of the electron stream path has a velocity substantially less than the velocity of electromagnetic waves in free space. The region in which interaction takes place between the electron stream and electromagnetic waves is called an interaction region.

In the M-J type of device, a steady electric field (i.e., one established by a unidirectional voltage source) is produced which has lines of force substantially perpendicular to the path of the electron stream and principally in a direction transverse to the lines of force produced by radio frequency electric fields. A magnetic field is also produced in the device which magnetic field has lines of force perpendicular both to the direction of travel of the electron stream and the lines of force produced by the electric field. The energy interchange mechanism of the M-J type interaction as distinguished from the interaction mechanism of the common M-type traveling-wave tubes and O-type traveling-wave tubes is unique and therefore, presents some unique problems.

For example, the unique configuration and placement of the radio frequency circuit, collector, and sole plate of the M-J type device presents the problem simultaneously of obtaining both a high circuit impedance in the area of the electron stream and uniform axial electron velocity across or throughout the cross section of the electron stream. With many of the circuits previously utilized with the M-J type traveling-wave device, such as the flattened helices and single finned structure, the problem is exceptionally acute. The impedance which a radio frequency circuit presents to an electron stream diminishes very rapidly (exponentially) with distance away from the circuit. Therefore, it is desirable to have the radio frequency circuit elements close together in between the sole and collector plates. However, if the circuits are close together, the steady electric field varies substantially across the electron stream or in the interaction region. This is necessarily true because the electric field parallel to a conductive plane must necessarily be zero. Therefore, the electric field between two spaced apart parallel planar circuit elements varies from zero at the circuit planes to a maximum between the circuits. Since the electron stream velocity is a direct function of the steady electric field and an inverse function of the magnetic field which it traverses (that is, the average stream velocity $$U_0=\frac{E_0}{B_0}$$

where $E_0$ is the steady electric field and $B_0$ is the unidirectional magnetic field), the velocity of the electron stream then must necessarily vary substantially across its cross section. This is extremely detrimental to traveling-wave and particularly M-J interaction since it becomes difficult to maintain synchronism between the electron stream and the electromagnetic waves. In view of these facts, it appears that an engineering compromise must be made between obtaining the desired impedance and the allowable variation in electron velocity across the cross section of the stream.

The present invention is directed to solving the particular problem by providing a traveling-wave magnetron of the M-J type wherein the configuration of the circuit elements is such that the compromise is substantially eliminated. That is to say, that a high circuit impedance is obtained with a uniform electric field across the stream cross section and hence a uniform electron velocity across the cross section of the stream.

The M-J type of interaction also presents a unique problem of confining the electron stream to the interaction region. When interaction of the M-J type takes place, the natural tendency is to spread electrons from the stream in all directions rather than to confine the electron flow. The magnetic field normally provided (perpendicular to the direction of the electric field) is effective in preventing spreading of the electron stream in the direction perpendicular to the magnetic field lines of force and in the direction of flow of the electron stream. However, it does not provide appreciable focusing in the dimension between the radio frequency circuit (along the magnetic lines of force). Unless the stream is maintained more or less intact, that is, focused throughout the length of its travel, interaction and hence gain is impaired and it is possible that the radio frequency circuit will collect some electrons from the stream. Both results are detrimental to the operation of the device. Thus, another aspect of the present invention is directed to a means for eliminating the beam spreading problem.

In carrying out the invention, electromagnetic waves are produced in the interaction region by a radio frequency circuit which is instrumental in confining the radio frequency electric field to a limited interaction space occupied by an electron stream. Focusing of electrons in the stream between the radio frequency circuits may be enhanced by providing a fixed magnetic field with an alternating gradient between the circuits. Focusing may be further enhanced by proper selection of electrode configuration. In one embodiment, the radio frequency slow-wave circuit and the magnetic field producing means are combined to provide a unitary radio frequency circuit and fixed field alternating gradient magnetic field, The novel features which are believed to be characteristic of the invention are specifically set forth in the appended claims. The invention itself, however, both as to its organization and method of operation together with objects and advantages thereof may best be understood by reference to the following description taken in connection with the accompanying drawings in which:

Figures 8, 9, 10:
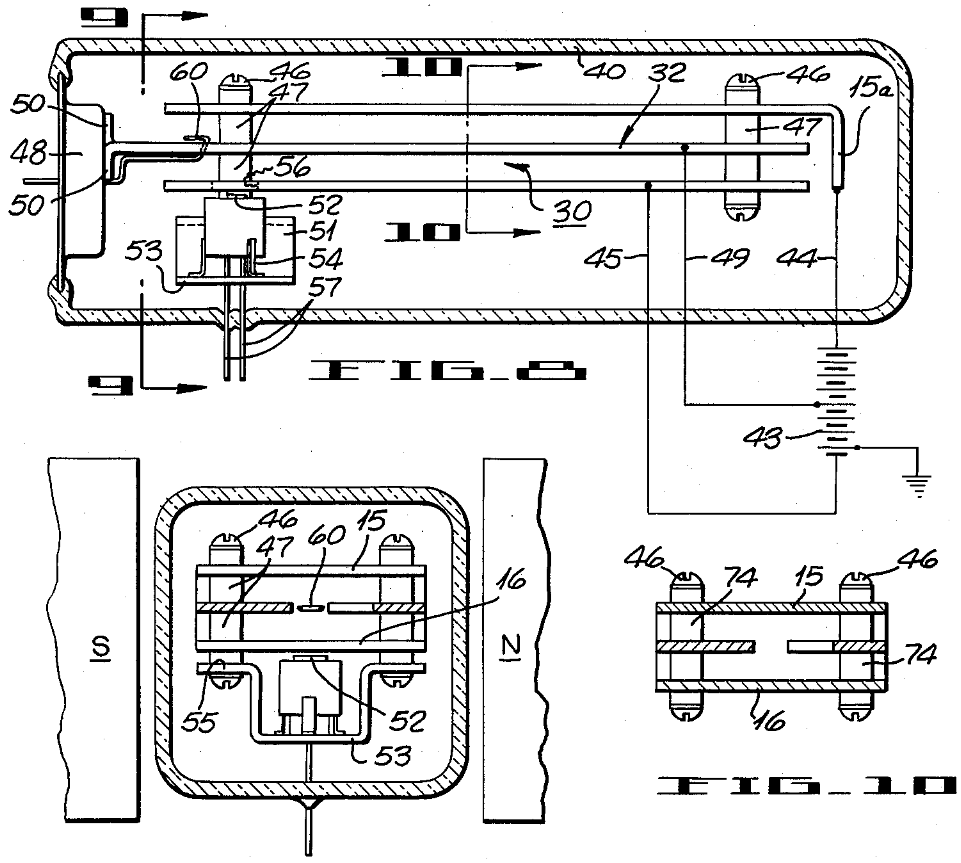
Figure 8 is a side elevation of a high frequency energy interchange device constructed in accordance with the present invention.
Figure 11:
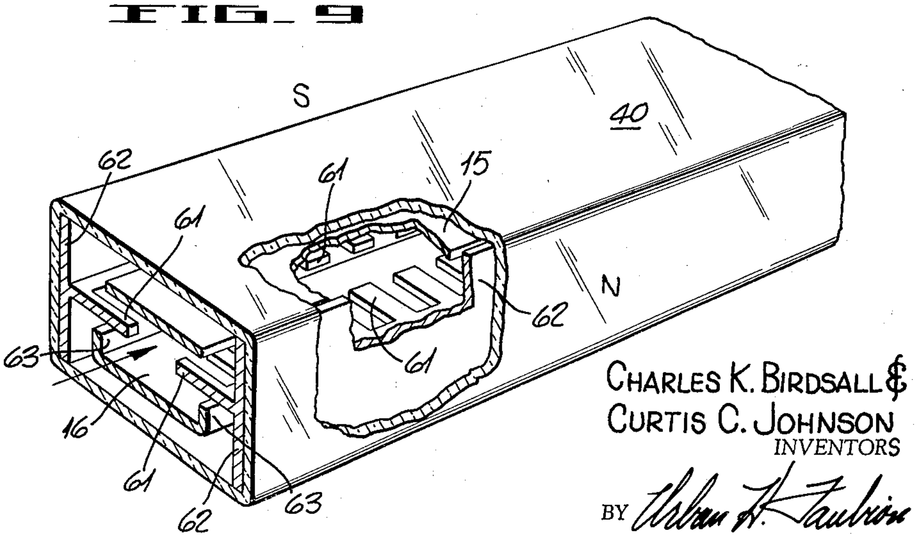
Figure 12:
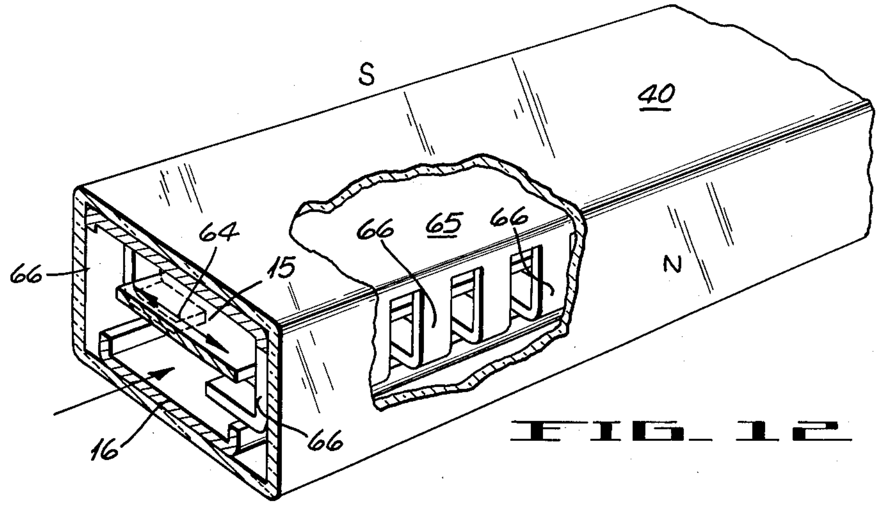
Figure 13:
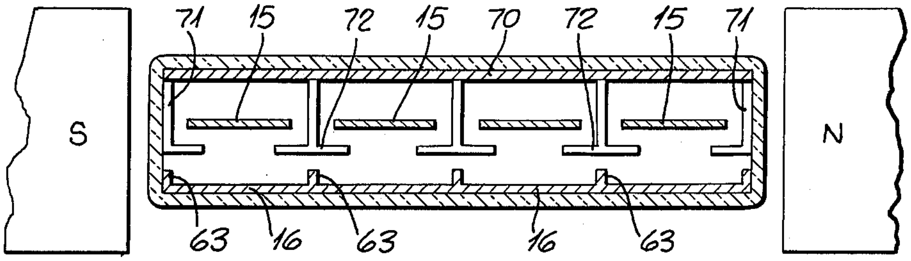
Figure 14:
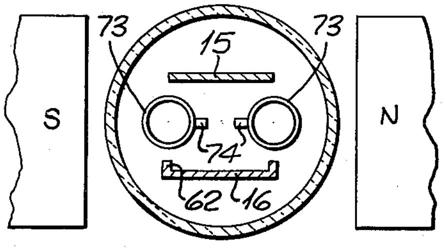
Figure 15:
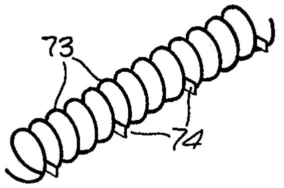

Figures 9 and 10 are transverse sections of the device of Figure 8 taken along section lines 8—8 and 9—9, respectively;

Figures 11 and 12 are perspective views and Figures 13 and 14 are transverse sections of high frequency energy interchange devices similar to that of Figure 8 illustrating different radio frequency circuit configurations within the contemplation of the present invention; and Figure 15 is a perspective view of the radio frequency circuit of the device illustrated in Figure 14.

Figures 1, 2:
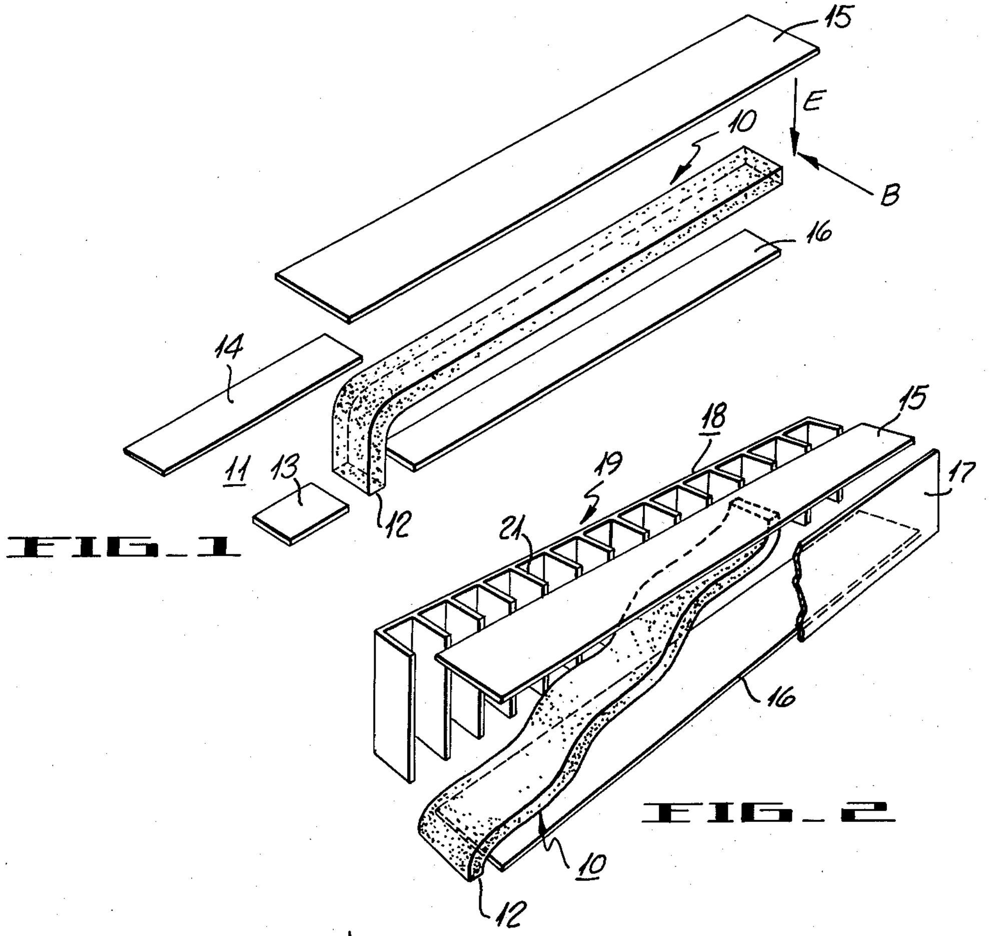
Figure 1 is a schematic exploded perspective view of a model utilized in describing the operation of the present invention.
Fig. 2 is an exploded perspective view of a model illustrating a basic configuration of apparatus constructed to provide interaction of the M-J type.

The simplified model of the high frequency energy interchange device illustrated in Figure 1 shows the relative orientation of essential component parts of a high frequency energy interchange device of the type to which the present invention is directed. A sheet of electrons 10 is formed by a conventional electron gun 11 which includes an electron emissive cathode member 12 and two spaced apart electron stream forming and directing electrodes 13 and 14. The electron gun is designed to direct the stream of electrons through an interaction region between a pair of substantially planar rectangular plates or electrodes 15 and 16 of conducting material, which occupy spaced apart parallel planes. One of the electrodes, i.e., the upper electrode 15, is referred to as the collector since it serves to collect electrons from the stream 10 when the device is in operation and the lower electrode 16 is referred to as the sole or reference electrode. The region between the collector 15 and the reference electrode 16 is called the interaction region due to the fact that it constitutes the region wherein an exchange of energy, or interaction, takes place between the electron stream and electromagnetic waves.

An electric field is established between the collector and sole plates 15 and 16 by providing a unidirectional potential difference between them. Usually, the sole plate 16 is placed at ground or reference potential and the collector 15 at some voltage which is positive with respect to the reference potential. Thus, an electric field is established between the two electrodes 15 and 16 which, according to convention, has lines of force perpendicular to both electrodes and in the direction from the positive collector plate 15 toward the sole plate 16, as indicated by the arrow marked E in Figure 1.

It is well known that such an electric field E produces a force on electrons passing therethrough which force is toward the collector plate 16. Therefore, if no other forces were present to act on the electrons in the electron stream 10, they would leave the cathode 12, enter the interaction region, and be deflected upward toward the collector plate 15. In the model shown, it is most desirable to provide an equilibrium condition whereby a sheet of electrons from the cathode 12 is directed down the interaction region without intercepting either the collector 15 or sole plate 16 unless a radio frequency electromagnetic wave is introduced in the interaction region. In order to produce such a condition, a magnetic field is established in the interaction region which has lines of force in a direction perpendicular to the electric field E and also perpendicular to the longitudinal axis of the interaction region of the structure.

The equilibrium condition for the electrons in the stream is provided by producing a magnetic field with lines of force directed into the paper as indicated by the arrow B in Figure 1. Since an electron moving normal to a magnetic field experiences a force perpendicular to the field and also normal to the direction of motion in accordance with Fleming's right hand rule, the resultant force produced on an individual electron passing through such a magnetic field is such as to move the electron toward the sole plate 16. The magnitudes of the magnetic field B and the electric field E are preferably adjusted so that the force produced on electrons passing axially down the interaction region by each is precisely equal.

Since forces produced by the electric and magnetic fields E and B are normal to the surfaces of the collector and sole plates and equal and opposite in direction, electrons from the cathode member 12 may pass throughout the length of the interaction region without being deflected. Regardless of whether or not a radio frequency field is applied, the "crossed" electric and magnetic fields have the advantage of acting upon the electrons in the stream to offset the spreading effect of space charge.

The apparatus described thus far does not differ materially from the ordinary M-type traveling-wave magnetrons. The principal difference between the structure of M-type traveling wave devices and the structure necessary to support the new type of interaction mechanism (the M-J interaction) may best be seen by reference to the apparatus illustrated in Figure 2. The model illustrated in Figure 2 is almost identical to that of Figure 1 but has two major components which are not present in the model of Figure 1. The first component is illustrated as being a rectangular plate or electrode 17, which may be a sheet of conductive material similar to the sole and collector plates 15 and 16. This plate 17, as illustrated, extends along the front side of the interaction region and occupies a plane perpendicular to the sole and collector plates 15 and 16. The second component which has been added is a transmission line 18 of the type generally referred to as a slow-wave circuit. The slow-wave circuit 18 illustrated consists of a substantially flat back plate 20 which extends along one side of the interaction region parallel to the conductive plate 17 and plurality of planar fins 21, which are spaced apart, are perpendicular to the flat back plate 20, and extend inwardly toward the interaction region. The slow-wave structure utilized is not crucial to this invention and may for example be any one of a number of interdigital, periodically loaded, or helical type slow-wave circuits. The particular slow-wave structure illustrated is known as a single finned structure and is described and illustrated on pages 21 through 59 of the book, "Traveling-Wave Tubes," by J. R. Pierce, Van Nostrand Co., Inc., New York, 1950. The flat side plate 17 in combination with the slow wave circuit 18 may be considered as the radio frequency circuit. The unidirectional potentials applied to these circuit elements are discussed in detail subsequently.

Thus, the principal structural difference between the

M-J energy interchange device and conventional traveling-wave magnetrons is that the slow-wave circuit of the traveling-wave magnetron occupies the position of the collector 15 of Figures 1 and 2, and acts as the radio frequency circuit as well as collector of electrons whereas the slow-wave circuit 18 in the present device is displaced to one side of the interaction region so that it is in a plane perpendicular to the magnetic field and is not intercepted by electrons from the stream in any appreciable amount. The more important operating or functional difference is described more fully below.

When a radio frequency electromagnetic field is introduced into the interaction region by propagating a radio frequency wave along the slow-wave structure 18, the equilibrium of the electron stream is disturbed and energy is imparted to the radio frequency wave by the electron stream.

The mechanism by which energy is transferred from the electron stream to the radio frequency wave is considered below from two different standpoints in order to develop an understanding of the best known theory of operation of the mechanism. First, the operation of the apparatus is considered in terms of groups of electrons in the electron stream and later the mechanism is explained in terms of individual electron trajectories or paths in the stream. When considering operation from the standpoint of collective groups of electrons in the electron streams, the gain mechanism may be considered as three separate but intimately related interactions. The combination of these interactions make up the new type of interaction. The separate interactions as discussed are as follows:

(1) M-type interaction
(2) O-type interaction
(3) Transverse interaction (along the magnetic field lines B)

The first type of interaction is generally considered to be an M-type interaction because it is the interaction which occurs in M-type devices. Interaction results from abstraction of potential energy from the unidirectional electric field by the electron stream as electrons in the stream are moved upward toward the collector in a transfer of a portion of the energy so gained to the radio frequency wave. This interaction depends upon movement of electrons in the stream from their initial position near the sole plate toward the collector plate in the vertical direction. The process does not abstract net kinetic energy from the stream and the stream remains focused. This type of interaction is most effective when the average electron velocity is equal to the axial component of the velocity of electromagnetic waves in the interaction region. The movement of the electron stream just described can be explained in terms of the forces produced by the crossed electric and magnetic fields E and B, respectively, in the interaction region. For example, the electrons in the electron stream are free to move in three dimensions or directions. They move longitudinally along the axis of the apparatus and electrons in the stream are either accelerated or decelerated by the radio frequency field depending upon their position with respect to this field and the equilibrium condition initially set up or produced by the crossed magnetic and electric fields B and E is upset. Since the force on electrons in a magnetic field is directly dependent upon their velocity, the force exerted on decelerated electrons by the electric field exceeds that exerted by the magnetic field and the decelerated electrons move in the vertical direction from the sole 16 toward the collector plate 15 to a region of higher potential. Thus, the electrons abstract or gain potential energy from the unidirectional field E and deliver energy to the radio frequency field as they move toward the collector to the region of higher potential. As electrons move upward, their instantaneous velocity is increased so that they maintain their average axial velocity and capability of delivering energy as they travel down the interaction region until they intercept the collector 15.

Simultaneously with the electron movement described above, motion of electrons may also occur along the magnetic field B, that is, in a direction perpendicular to both the electric field and the longitudinal axis of the device, but this movement or motion is not essential to the operation of the ordinary M-type device and, as far as is presently known, does not contribute materially to the transfer of energy between the electron stream and the collector or slow-wave circuit of an M-type traveling-wave tube.

The second type of interaction occurs as a result of redistribution of electrons in the stream in the axial direction. This type of interaction is commonly referred to as the O-type interaction since it is the principal interaction mechanism in the O-type traveling-wave tube. This type of interaction is characterized by the fact that as the electrons in the electron stream move axially along the interaction region, the electrons in the stream are alternately accelerated and decelerated in such a manner that bunches of electrons are formed. These electron bunches move along the stream 10 at an average velocity equal to that of the stream as determined by the accelerating voltage. If this average velocity exceeds that of the electromagnetic waves propagated down the interaction region, the radio frequency field abstracts more energy from the electron stream than it gives up to the electron stream. Thus, the radio frequency wave on the slow wave structure 18 grows as it travels down the interaction region.

The third type of interaction involves an exchange of energy due to movement of electrons in a direction which is normal or transverse to both the direction of movement of the stream (along the interaction region) and the lines of force of the electric field E. In other words, this type of interaction depends upon movement of electrons in the direction of the lines of force of the magnetic field B. Further, if the net energy transfer in this type of interaction is to be from the electron stream to the electromagnetic wave, the electrons in the stream should be moving down the interaction region at an average velocity which is greater than that of the axial component of the electromagnetic wave.

When the electron stream 10 is injected into the interaction region in the presence of a radio frequency wave and near the sole 16, it is deflected toward and away from the slow-wave circuit 18 and toward the collector 15 by the radio frequency field. Thus, the entire electron stream 10 has a stepped and snaking appearance as it moves from side to side and rises in the interaction region. The orientation of the electric and magnetic field E and B is such that the electron stream is near the slow-wave circuit 18 when the radio frequency field introduced into the region is of a phase to abstract energy and away from the slow-wave circuit 18 when the fields are of a phase to abstract energy from the electron stream. Since the radio frequency field is greatest near the circuit and diminishes very rapidly (exponentially) with distance from the circuit, the stream 10 gives up more energy to the radio frequency field than it receives therefrom. This aspect of interaction is aided by the fact that the relative velocities of the electrons and electromagnetic waves is such that the electrons are in a bunched condition when near the slow-wave circuit 18.

From the foregoing discussion it is seen that the new interaction is similar to both the O-type and M-type interaction in some respects but differs from each. The interaction mechanism is similar to that of the M-type traveling-wave tube in that the electrons in the stream drift toward a collector plate to a region of higher potentional, maintaining their drift velocity and capability of delivering energy until collected on the collector 15. The interaction mechanism of the device of the present invention is similar to the O-type interaction in that the electrons in the stream are bunched by the radio frequency fields and the electrons must have a velocity which is greater than that of the axial component of the electromagnetic waves in the interaction region, if the conditions described above are to be met. However, the new interaction mechanism is different from both of these interaction mechanisms due to the fact that it depends upon movement of the electrons in the stream toward and away from the slow-wave circuit 18 to cause the radio frequency electromagnetic waves to grow.

When the electrons are injected into the interaction region at a velocity equal to the axial component of the velocity of propagation of the electromagnetic waves through the interaction region (called the synchronous velocity), there is substantially no energy exchanged between the electromagnetic waves and the electron stream for the model illustrated in the figures thus far described. At least, there are no first order effects. In practice some energy interchange does take place and when the configuration of the tube is changed or altered or if the circuit shape is altered, some energy interchange also takes place.

When electrons in the stream move down the interaction region at a velocity less than the velocity of propagation of the electromagnetic waves, the electrons tend to move toward the sole 17 and take energy from the radio frequency wave so that the wave diminishes in amplitude along the length of the interaction region. At velocities much above or below synchronism there can be little or no stream deflection toward or away from the slow wave circuit 18.

Figure 3:
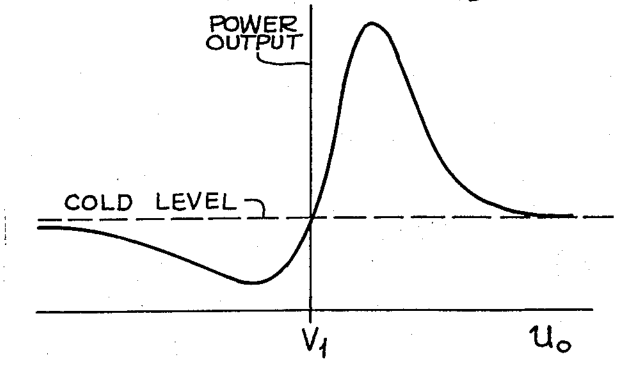
Figure 3 is a graph utilized in explaining the operation of the device of Figure 2 and illustrating the gain as a function of electron stream velocity and velocity of propagation or radio frequency electromagnetic waves down the interaction region.

Figure 3 illustrates the relationship of the output or gain of the energy interchange apparatus as a function of the velocity of the electron stream $u_0$ (usually expressed in volts). In this figure the velocity $u_0$ of the electron stream 10 is plotted along the axis of ordinates and the power output of the device is plotted along the axis of the abscissa. The broken line labeled Cold Level shows the power output when there is no electron stream in the device. The vertical axis marked $V_1$ indicates the synchronous velocity of the stream. That is, velocity $V_1$ is the stream velocity which is equal to the velocity of propagation of the axial component of the electromagnetic wave. Notice that for this condition there is no appreciable increase in power output over the cold level. As indicated in the description above, the figure shows that with electrons in the stream moving at velocities below synchronous velocity $V_1$, the output power is actually less than the cold level, and above synchronism the output power is greater than the cold level power.

As previously indicated, the radio frequency electric fields in the interaction region of the device of Figure 2 are not confined to the immediate area between the radio frequency circuits which consist of the single finned circuit 18 on one side and the circuit plate 17 on the opposite side of the structure. The radio frequency fields link both the radio frequency circuit parts and the collector and sole plate and generally fringe out from the interaction region. This is particularly illustrated by the lines marked E in Figure 4. From this figure it is seen that the radio frequency fields are not confined to the area occupied by the electron stream. Thus, the radio frequency circuit does not present a high impedance to the electron stream 10.

Figures 4, 5, 6:
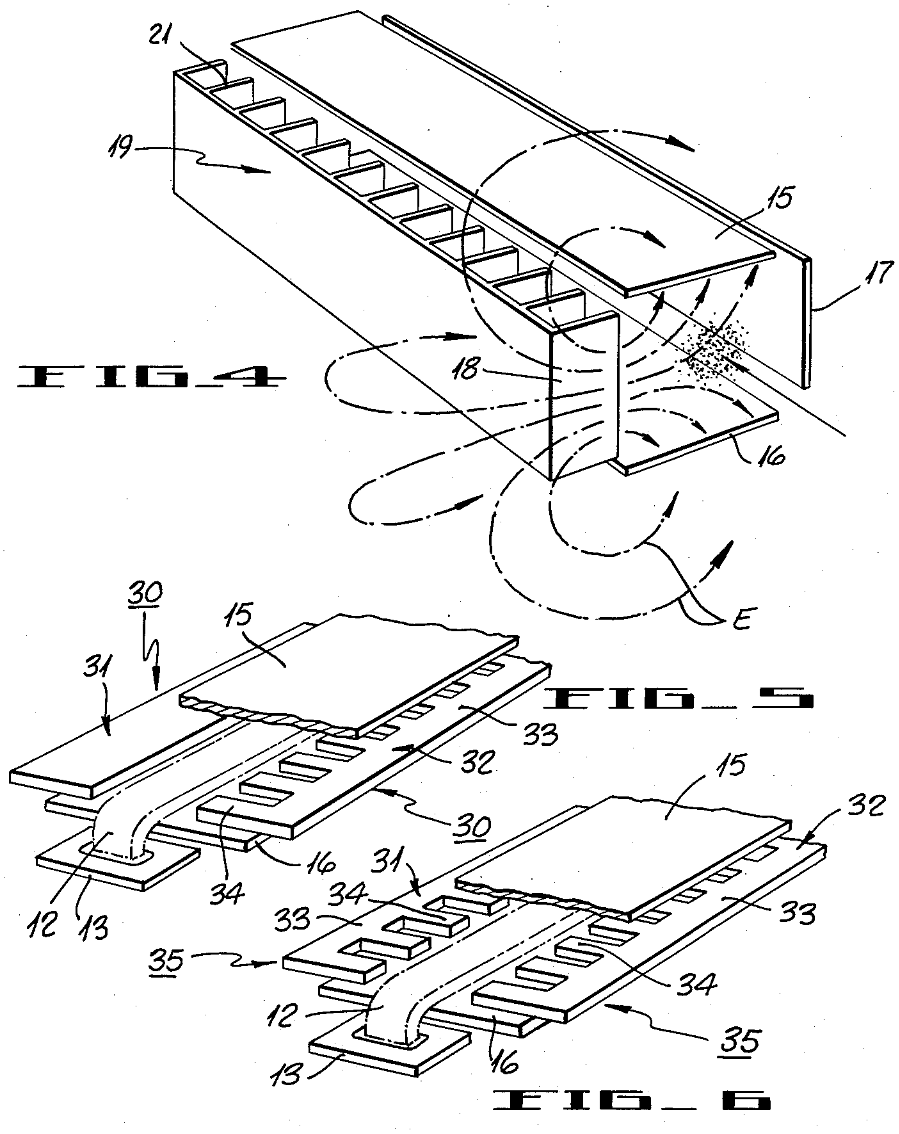
Figure 4 is another perspective view (from another angle) of the high frequency energy interchange device of Figure 2 illustrating the configuration of radio frequency electric fields in the device.
Figures 5 and 6 are partial isometric views of a high frequency energy interchange device constructed in accordance with the present invention.

In order to provide a concentration of the radio frequency electric field in the area traversed by the electron stream, the single finned radio frequency circuit as illustrated in the device of Figures 2 and 4 is replaced by circuits of the type which may be called "ladder circuits." Embodiments of electron tubes utilizing the M–J interaction with such circuits are illustrated in Figures 5, 6, 7 and 8 of the drawings.

In the embodiment of Figure 5, collector and sole plates 15 and 16 respectively are provided which correspond to the collector and sole plates of the devices illustrated in Figures 2 and 4. That is, the collector and sole plates 15 and 16 are spaced apart on opposite sides of the interaction region and the radio frequency circuit 30. The radio frequency circuit 30 consists of a relatively thin plate of conductive material 31 placed on one side of the interaction region and a correspondingly thin comb-like structure 32 positioned on the opposite side of the interaction region in the same plane. The comb-like portion 32 of the radio frequency circuit has a continuous planar conductive backing portion 33 which extends along the length of the interaction region and teeth 34 which extend in toward the interaction region from the back portion. Thus the opposite portions of the radio frequency circuit, i.e., the comb-like portion and the flat plate are placed on opposite sides of the interaction region and occupy a common plane which is parallel to and between the planar collector plate 15 and sole plate 16.

In order to provide interaction, an electron stream forming and directing gun 11 which corresponds to the gun illustrated and described in Figure 1 is positioned at one end of the device to direct a stream down the length of the interaction region between the radio frequency circuit 30 and the collector and sole plates 15 and 16. M-J interaction takes place in the manner described in detail in connection with Figures 2 and 3 when the electrodes are established at proper potentials (electrical connections not shown in this figure since they are identical to those described subsequently in connection with Figure 8).

The electron gun 11, collector and sole plates 15 and 16 in the device of Figure 6 are identical in both configuration and position to those of Figure 5. Consequently, these elements are given the same reference numerals in both figures. A different radio frequency circuit is used in the device of Figure 6, however, in the modification of Figure 6, the radio frequency circuit 35 consists of two of the comb-like structures 32 allochirally positioned on opposite sides of the interaction region so that the electron stream is directed between the opposing teeth of the two circuit portions. That is, the thin planar comb-like structures 32 are positioned with the continuous conductive back portions 33 extending down opposite sides of the interaction region and the teeth 34 spaced apart to accommodate the electron stream 13 but extending inwardly toward the interaction region. This circuit configuration is known as a split ladder.

As illustrated, the teeth 34 of each circuit portion 33 are directly opposite one another (in register) but for some purposes it may be desirable to stagger them. This is accomplished by positioning the comb-like structures 33 on opposite sides of the interaction region so that the teeth 34 on one side are opposite gaps of the opposite portion of the radio frequency circuit. This arrangement still allows the radio frequency electric field lines to be concentrated in the area traversed by the electron stream 10 but additionally provides components of the radio frequency electric field longitudinally along the length of the interaction region. The major difference in terms of electrical operation between the split ladder configuration with staggered teeth and with teeth in register is that the radio frequency waves may be applied in phase to both halves of the circuit 35 when the teeth 34 are staggered, but best results are obtained if the circuit portions are fed out of phase when the teeth 34 are in register.

Figure 7:
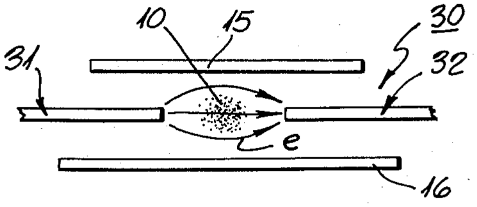
Figure 7 is a transverse section through the devices of Figures 5 and 6 illustrating the configuration of radio frequency electric fields therein.

Figure 7 may be considered an end view of either the device illustrated in Figure 5 or the device illustrated in Figure 6. The particular figure shows the collector plate 15, sole plate 16 and radio frequency circuit portion only. The purpose of the figure is to illustrate the configuration of the radio frequency electric field *e* when utilizing the ladder circuits 30 and 35 illustrated in Figures 5 and 6. From an inspection of Figure 7, it is seen that the radio frequency electric field *e* is concentrated in the region traversed by the electron stream 10. Since the radio frequency fields are concentrated in the area traversed by the electron stream, the radio frequency circuit illustrated presents a high impedance to the electron stream. The high circuit impedance presented to the electron stream allows a high gain per unit circuit length.

Since the radio frequency circuits 30 and 35 of Figures 5 and 6 are very thin, they do not interfere with the steady electric field configuration between the collector plate 15 and the sole plate 16. As a consequence, the circuits illustrated and described with respect to Figures 5 and 6 present a high impedance to the electron stream 10, and, at the same time, allow a substantially uniform steady electric field to be provided across the entire cross section of the electron stream. Since the steady electric field is uniform over the cross section of the electron stream, the electron velocity is substantially constant throughout the cross section of the electron stream 10. Thus, the use of these ladder circuits substantially eliminates the comprise which normally must be made in tubes utilizing the M-J interaction between obtaining the desired circuit impedance and obtaining a uniform electron velocity across the electron stream.

As was previously indicated, the natural tendency is for the electrons in the stream 10 to spread in all directions rather than to be confined. The magnetic field B normally provided in the crossed field type tube (perpendicular to the direction of the electric field and the flow of electrons in the electron stream) is effective in preventing of spreading of the stream in the direction perpendicular to the magnetic field lines of force (toward the sole and collector plates 15 and 16). The unidirectional potential of the electrodes and circuit elements are established as explained subsequently in connection with Figure 8. However, there is the additional problem in devices employing the M-J type interaction of providing focusing in the dimension between the radio frequency circuit.

A further embodiment of the present invention provides magnetic focusing force in the remaining dimension by imposing an alternating gradient on the magnetic field in the interaction region. This is accomplshed by making the allochirally positioned comb-shaped portions 32 of the radio frequency circuit illustrated in Figure 6 of magnetic material. This has the effect of extending the magnetic field producing magnets (N and S) into the interaction region as well as superimposing an alternating gradient on the otherwise fixed magnetic field.

Figures 8, 9 and 10 show a complete traveling-wave tube constructed in accordance with the present invention. The structure includes a closed and evacuated elongated envelope 40 of substantially rectangular cross-section. Envelope 40 encloses the various electrode elements. The electrode elements enclosed within the vacuum envelope correspond in function and general orientation to those elements illustrated and described in connection with Figure 5 of the drawings. Since the relationship of the collector plate 15, sole plate 16, and radio frequency circuit 30 is described in detail in connection with Figure 7, the description is not repeated in detail at this point. However, it is seen from Figure 8 that the substantially planar rectangular collector electrode 15 is provided with an electron collector end portion 15*a* which extends perpendicular to the horizontal plate and down past the end of the interaction region. It may be noted from Figures 8, 9 and 10 that the collector electrode 15 and the planar rectangular sole plate 16 are held in spaced parallel relation and the portions of the split ladder radio frequency circuit are held between, spaced from, and in parallel relation to these electrodes (15 and 16) by bolts 46 and ring-shaped insulating spacers 47.

The supporting bolts 46 extend through the four corners of each electrode and through the back portion 33 of the radio frequency circuit 30 and the insulating spacers 47 surround the bolts 46 and hold the electrodes 15 and 16 and elements of the radio frequency circuit 30 apart. The ends of the radio frequency split ladder circuits 30 extend on past the collector and sole plates 15 and 16 and are mounted to a base member 48 which is sealed in one end of the envelope 40. As illustrated, tabs 50 on the extended portions of the circuit 30 are bent at right angles to the plane of the circuit and brazed to the base member 48. In this manner, the entire assembly is supported in the envelope 40 in the desired position.

An electron stream forming and directing electron gun 51 is positioned inside one end of the evacuated envelope 40 for the purpose of directing an electron stream down the interaction region defined between the electrodes 15 and 16 and the portions of the radio frequency circuit 30. The electron gun 51 may be any one of a number of conventional type guns, but the particular one illustrated includes an electron emissive cathode member 52 of the button type and a filamentary heater element (not shown) connected to a source of potential (also not shown). The cathode member 52 comprises a disc shaped end member with a cylindrical skirt which extends downwardly and surrounds the heater member. The cathode and heater assembly is mounted on the concave side of a substantially U-shaped cathode support member 53 by means of L-shaped support rods 54 which have one leg fixed to the bottom of the U-shaped member 53 and the other leg fixed to the skirt of cathode member 52. The uprights of the U-shaped cathode support member 53 have ears or tabs 55 which extend outwardly and provide a means for fixing the position of the cathode 52 with respect to the position of the electrodes 15 and 16 and circuit 30 of the device. The cathode support member 53 is held in position beneath the sole plate 16 by passing one of the two bolts 46 which are at the base end of the device through each of the ears or tabs 55 and also providing a pair of the insulating spacers 47 between the sole plate and the ears 55. In this manner, cathode button 12 is held immediately beneath an aperture 56 provided in the sole plate 16 for allowing electrons from the cathode to enter the interaction region.

The heater member is supported within the skirt of the cathode member 52 by means of supporting conductors 57 which extend out through the envelope 40. When the heater conducting supports are connected to a potential source, the electron emissive cathode member 52 is heated and emits a cloud of electrons. One point not apparent from the drawings is that the potential of the cathode member 52 is established at ground or reference by one of the two heater support conductors 57 which is also connected to the cathode. The cloud of electrons emitted by the cathode 52 are formed into a stream and directed down the length of the evacuated envelope 40 by virtue of the undirectional potential established on the spaced apart and parallel electrodes and radio frequency circuit 30 and the magnetic field established in the interaction region.

The potential established on the electrodes 15 and 16 is selected to give the desired steady electric field E in the interaction region and is provided by connecting the collector plate 15 to the positive terminal of the unidirectional potential source 43 and the sole plate 16 to a negative potential (negative with respect to ground or reference) by means of conductive leads 44 and 45, respectively, which are brought in through the wall of the envelope 40. The potential of the radio frequency circuit 30 is established at a value between the potential of electrodes 15 and 16 by means of conductive lead 49 which is also connected to the source 43. In practice, the leads 43, 44 and 45 are brought out through conductive pins (not shown) in the tube base 48 but the connections are schematically illustrated for clarity. Magnetic lines of force are established in the interaction region between the collector and sole plates 15 and 16 by providing pole pieces N and S (as best seen in Figure 9 of the drawings).

The particular device illustrated in Figures 8, 9 and 10 is an oscillator of the backward wave type. Radio frequency waves are produced on the radio frequency circuit 30 and propagated down the interaction region. Interaction of the type known as M-J interaction takes place to provide the oscillations. Radio frequency electromagnetic waves are abstracted from the radio frequency circuit 30 is a well known manner by means of a coupling loop 60 which is capacitively coupled to the circuit and brought out through the base 48 .

Figures 11 through 14, inclusive, show traveling-wave tubes of the general type under consideration. Since these views are shown principally to illustrate radio frequency circuit arrangements, complete vacuum devices are not illustrated. Components of the devices which correspond exactly to those components illustrated in Figures 8, 9 and 10 are given the same reference numerals in order to simplify the description.

In Figure 11, the circuit 61 utilized is identical to the circuit illustrated in Figure 6, i.e., it is a split ladder circuit, with the exception that the circuit 30 extends inwardly from conductive side walls 62 which walls extend along the internal surface of the envelope 40 and cover the internal surface thereof. The side walls 62 provide a means of supporting the circuit 30. It will be noted that the sole plate 16 in the tube of Figure 11 has upturned ends 63 which extend down the length of the tube. These upturned ends 63 are provided in order to shape the electric field in the interaction region in such a manner as to help prevent spreading of the electron stream 10. This action may be further enhanced by shaping the collector electrode 15 in such a manner that its center portion is depressed toward the sole plate 16 down its full length. However, this depression should be relatively slight, and the term "substantially planar" as utilized in the present description is intended to apply to such an arrangement. The effect of the concave sole 16 and convex collector 15 (concave and convex with respect to the interaction region) is to give a more or less trough shaped radio frequency electric field configuration in the interaction region which helps focus the stream 10.

In Figure 12 the energy interchange device has all the components of the tube of Figure 11 including the upturned edges 63 on the sole plate 16. However, the radio frequency circuit 64 is of a different construction. As illustrated, the radio frequency circuit 64 includes a conductive plate 65 which extends above the interaction region and along the full length of the envelope 40. L-shaped fingers 66 are allochirally suspended from the conductive plate 65 in such a manner that the vertical legs of the L-shaped conductors extend down beneath the collector plate 15, and the finger tips defined by the horizontal leg of the L extend into the interaction region (toward each other) and are staggered. The L-shaped fingers 66 do not have to be staggered but may be in register.

In the particular arrangement illustrated in Figure 12, the magnets N and S may be brought in closer to the interaction region than is possible with the arrangement illustrated in Figure 11. This is true since the length of the fingers is determined by electrical considerations and a part of the length of the L-shaped fingers 66 is vertical whereas the full length of the fingers in the circuit 61 of Figure 11 is in the horizontal plane. The fingers are preferably designed to have a physical length which corresponds electrically to one quarter wave length at the frequency of interest.

Figure 13 illustrates the cross section of the M-J type high frequency energy interchange devices operated with a plurality of parallel electron streams and the circuits operated in parallel. The individual sole plates for each of the parallel devices are all given the same reference numerals as the sole plates of the devices of Figures 11 and 12. In a like manner, the radio frequency circuits are made up of a plurality of the conductive fingers, as described with respect to the vacuum tube of Figure 12, operated in parallel.

One way to visualize the parallel circuit arrangement is to consider the circuit surrounding each electron stream 10 as allochirally positioned L-shaped fingers suspended from a conductive plate 70 which extends over all of the individual interaction regions with the vertical bar of the L of circuit portions between adjacent electron streams. Thus, the two outer circuits 71 are the only ones which correspond exactly to the L-shaped fingers 66 in Figure 12, and the conductive fingers 72 between the two outer L-shaped fingers 71 (between electron streams) have the configuration of inverted T-shaped members suspended from the conductive plate 70 by the upright leg of the T. Once again, the finger tips which extend into a given interaction region may either be staggered as in Figure 12, or in register.

Figure 14 illustrates the use of helical transmission lines without departing from the spirit of the present invention. The circuit illustrated includes a pair of helices 73 disposed on opposite sides of the interaction region with parallel longitudinal axes. Tabs 74 are provided on the circumference of the helices which extend inwardly toward each other so that they form finger-like elements just as the fingers in the ladder circuits previously described. The exact configuration of the circuit may best be seen by reference to Figure 15 whereas the placement of these helices in the interaction region is best seen in Figure 14. By the use of this arrangement, certain of the advantages of helical transmission lines are obtained.

While particular embodiments of the invention have been shown, it will, of course, be understood that the invention is not limited thereto, since many modifications, both within the circuit arrangements and in the instrumentalities employed, may be made. It is contemplated that the appended claims will cover any such modifications as fall within the true spirit and scope of the invention.

What we claim is new and desire to secure by Letters Patent of the United States is:

1. A high frequency energy interchange device of the type which depends on an interchange of energy between an electron stream and electromagnetic waves in a region of mutually perpendicular electric and magnetic fields including a substantially planar reference electrode, a collector anode of the same general configuration disposed in spaced parallel relation with respect to said reference electrode, electron gun means for producing and directing a stream of electrons between said collector and reference electrodes and along the length of the interaction region defined therebetween, a slow-wave radio frequency transmission line having substantially planar portions disposed on opposite sides of the region between said electrodes occupying a common plane parallel to said electrodes and extending into the interaction region thereby defining a path therebetween for the electron stream, means for establishing a steady electric field having lines of force extending between said reference electrode and said collector electrode, and means for providing a magnetic field in the interaction region having lines of force extending substantially parallel to the plane of said electrodes and perpendicular both to the direction of travel of the electron stream and the lines of force produced by the electric field.

2. Apparatus for providing an interchange of energy between an electron stream and electromagnetic waves in an interaction region including a first pair of substantially planar electrodes spaced apart in parallel relationship to define an elongated interaction region therebetween and produce a steady electric field in the interaction region, electron gun means for producing and directing a stream of electrons down the length of the interaction region between said parallel electrodes, means to produce a magnetic field in said interaction region having lines of force perpendicular to both the lines of force of said electric field and the length of the interaction region, and substantially planar circuit means disposed between and parallel to said electrodes and extending down opposite sides of said interaction region for substantially the full length defining a path therebetween for the electron stream, said circuit means including at least one comb-like structure having a conductive back portion with conductive teeth extending into the interaction region.

3. In a high frequency energy interchange device for producing amplification and oscillation in the microwave frequency spectrum, a first pair of spaced and parallel electrodes defining an elongated interaction region therebetween, means to establish an electric field in said interaction region having lines of force normal to said electrodes, means for producing a magnetic field in said interaction region of such magnitude and sense as to cause electrons from said stream to travel down the length of said interaction region, circuit means defining a second pair of substantially coplanar electrodes disposed on opposite sides of said interaction region parallel to said first pair of parallel electrodes to propagate a radio frequency electromagnetic wave down said interaction region with a velocity less than the velocity of light and defining a path therebetween for the electron stream, each of said second pair of electrodes comprising a comb-like structure having a conductive back portion and conductive teeth extending into the interaction region.

4. A high frequency energy interchange device of the traveling wave type for ultra high frequencies including the combination of a pair of parallel conducting surfaces spaced apart in substantially coextensive relationship defining an interaction region therebetween, means for impressing a unidirectional electromotive force between said surfaces thereby to produce an electric field in said interaction region having lines of force normal to said surfaces, circuit means defining a pair of coplanar conductive members disposed on opposite sides of the interaction region parallel to said pair of parallel conductive surfaces, each of said conductive members comprising a comb-like structure having a conductive back portion and conductive teeth extending into the interaction region thereby defining a path therebetween for the electron stream, electron gun means for producing and directing a stream of electrons down the interaction region between said electrodes and between said conductive members at a velocity greater than the velocity of propagation of the electromagnetic waves therein and means for producing a magnetic field in the said interaction region having lines of force perpendicular both to the direction of travel of the electron stream and the lines of force produced by the electric field.

5. In combination in a high frequency energy interchange device which depends upon an interchange of energy between an electron stream and electromagnetic waves to produce amplification and oscillation in the microwave frequency spectrum, electron gun means providing a stream of electrons, a reference electrode and a collector electrode disposed in substantially parallel relationship to accommodate the stream of electrons from said electron gun means, a substantially planar radio frequency slow-wave transmission line structure including two portions disposed in a plane parallel to said reference and collector electrodes for the purpose of propagating electromagnetic waves in the region therebetween, each portion of said transmission line structure including a comb-like structure of conductive and magnetic material having a back portion with conductive teeth extending into the region between electrodes and defining a path therebetween for the electron stream, conductive means connected to said reference and electron collector electrodes for establishing a potential difference therebetween whereby an electric field is established between said electrodes, and means for establishing magnetomotive force between portions of said radio frequency circuit to provide a fixed magnetic field with an alternating gradient therebetween.

6. Apparatus for providing an interchange of energy between an electron stream and electromagnetic waves in an interaction region including a first pair of substantially planar electrodes spaced apart in parallel relationship to define an elongated interaction region therebetween and produce a steady electric field in the interaction region, electron gun means for producing and directing a stream of electrons down the length of the interaction region between said parallel electrodes, means to produce a magnetic field in said interaction region having lines of force perpendicular to both the lines of force of said electric field and the length of the interaction region, and substantially planar circuit means disposed between and parallel to said electrodes and extending down opposite sides of said interaction region for substantially the full length, said circuit means including one comb-like structure having a conductive back portion with conductive teeth extending into the interaction region and one solid portion spaced apart to define a passage for the electron stream therebetween.

7. A high frequency energy interchange device of the traveling-wave type for ultra high frequencies including the combination of a pair of parallel conducting surfaces spaced apart in substantially coextensive relationship defining an interaction region therebetween, means for impressing a unidirectional electromotive force between said surfaces thereby to produce an electric field in said interaction region having lines of force normal to said surfaces, circuit means defining a pair of coplanar conductive members disposed on opposite sides of the interaction region parallel to said pair of parallel conductive surfaces, each of said conductive members comprising a comb-like structure having a conductive back portion and conductive teeth extending into the interaction region and spaced apart thereby to define a path for the electron stream, said comb-like structures being positioned so that teeth on opposite sides of the interaction region are in alignment, electron gun means for producing and directing a stream of electrons down the interaction region between said electrodes and between said conductive members at a velocity greater than the velocity of propagation of the electromagnetic waves therein, and means to produce a magnetic field in the said interaction region which has lines of force perpendicular both to the direction of travel on the electron stream and the lines of force produced by the electric field.

8. In a high frequency energy interchange device for producing amplification and oscillation in the microwave frequency spectrum, a first pair of spaced and parallel electrodes defining an elongated interaction region therebetween, means to establish an electric field in said interaction region having lines of force normal to said electrodes, means for producing a magnetic field in said interaction region of such a magnitude and sense as to cause electrons from said stream to travel down the length of said interaction region, circuit means defining a second pair of substantially planar electrodes disposed on opposite sides of said interaction region parallel to said first pair of parallel electrodes to propagate a radio frequency electromagnetic wave down said interaction region with a velocity less than the velocity of light, each of said second pair of electrodes comprising a comb-like structure having a conductive back portion and conductive teeth extending into the interaction region and spaced apart thereby to define a path for the electron stream, said comb-like structures being positioned to provide that the teeth of the structures on opposite sides of said interaction region are out of alignment.

9. A high frequency energy interchange device of the type which depends upon an interchange of energy between an electron stream and electromagnetic waves in a region of mutually perpendicular electric and magnetic fields comprising a reference electrode, an electron collector electrode in spaced parallel relation to said reference electrode to define an interaction space therebetween, an elongated slow-wave structure constructed to propagate electromagnetic waves down the length of the interaction region at a fraction of the speed of light, input energy coupling means connected to said slow-wave structure for introducing radio frequency waves thereon, said slow-wave structure comprising a planar conductive portion with L-shaped conductive fingers allochirally suspended therefrom in such a manner as to provide inwardly directed tips in a common plane, said slow-wave structure positioned with said planar portion parallel to said electrodes and outside the interaction region and said inwardly directed tips extending into the interaction region, electron gun means for forming and directing a stream of electrons down the interaction region at a velocity greater than the velocity of propagation of a component of the electromagnetic wave, means providing a magnetic field having lines of force in a direction parallel to the plane of said reference and collector electrodes and perpendicular to the direction of travel of the electron stream, separate input electrical conductors connected to said collector electrode and said reference electrode to establish the potential of said electrodes at different levels to produce an electric field having lines of force extending from said reference electrode to said collector electrode and substantially perpendicular to the path of said electron beam and to the lines of force of said magnetic field, and output energy coupling means connected to said slow-wave structure to receive radio frequency energy therefrom.

10. A high frequency energy interchange device of the type which depends upon an interchange of energy between charged particles and electromagnetic waves in a region of mutually perpendicular electric and magnetic fields comprising means to provide at least two parallel charged particle streams, a reference electrode and an electron collector electrode on the opposite side of each of the streams and in parallel relation, a slow-wave transmission line for each charged particle stream, each transmission line having substantially planar portions on opposite sides of its associated charged particle stream occupying a plane parallel to said electrodes and extending in toward said stream, means for establishing a steady electric field having lines of force extending between reference and collector electrodes, and means for providing a magnetic field in the region of the charged particle streams having lines of force extending substantially parallel to the plane of said electrodes and perpendicular both to the direction of travel of the electron streams and the lines of force produced by the electric field.

11. A high frequency energy interchange device of the type which depends on an interchange of energy between an electron stream and electromagnetic waves in a region of mutually perpendicular electric and magnetic fields including a substantially planar collector anode, a substantially planar reference electrode disposed in spaced parallel relation with respect to said collector electrode defining an interaction region therebetween, said reference electrode having edge portions which are perpendicular to the plane of the reference electrode, extend down the length of the interaction region and up toward the collector electrode, electron gun means for producing and directing a stream of electrons between said collector and reference electrodes and along the length of the interaction region, a slow-wave radio frequency transmission line having portions disposed on opposite sides of the region between said electrodes, said slow-wave transmission line including substantially planar portions positioned on opposite sides of said region between said electrodes occupying a plane parallel to said electrodes and extending into the interaction region therebetween from opposite sides, means for establishing a steady electric field having lines of force extending between said reference electrode and said collector electrode, and means for providing a magnetic field in the interaction region having lines of force extending substantially parallel to the plane of said electrodes and perpendicular both to the direction of travel of the electron stream and the lines of force produced by the electric field.

12. In combination in a high frequency energy interchange device which depends upon an interchange of energy between an electron stream and electromagnetic waves to produce amplification and oscillation in the microwave frequency spectrum, electron gun means providing a stream of electrons, a reference electrode and a collector electrode disposed in substantially parallel relationship to accommodate the stream of electrons from said electron gun means and define an interaction region therebetween, said reference electrode having edge portions which are perpendicular to the plane of the reference electrode, extend down the length of the interaction region and up toward the collector electrode, a substantially planar radio frequency slow-wave transmission line structure including two portions disposed in a plane parallel to said reference and collector electrodes for the purpose of propagating electromagnetic waves in the region therebetween, each portion of said transmission line structure including a comb-like structure of conductive and magnetic material having a back portion with conductive teeth extending into the region between electrodes, conductive means connected to said reference and electron collector electrodes for establishing a potential difference therebetween whereby an electric field is established between said electrodes, and means for establishing magnetomotive force between portions of said radio frequency circuit to provide a fixed magnetic field with an alternating gradient therebetween.

13. A high frequency energy interchange device of the type which depends upon an interchange of energy between an electron stream and electromagnetic waves in a region of mutually perpendicular electric and magnetic fields comprising a substantially planar collector anode, a substantially planar reference electrode disposed in spaced parallel relation with respect to said collector electrode defining an interaction region therebetween, said reference electrode having edge portions which are perpendicular to the plane of the reference electrode, extend down the length of the interaction region and up toward the collector electrode, an elongated slow-wave structure constructed to propagate electromagnetic waves down the length of the interaction region at a fraction of the speed of light, input energy coupling means connected to said slow-wave structure for introducing radio frequency waves thereon, said slow-wave structure comprising a planar conductive portion with L-shaped conductive fingers allochirally suspended therefrom in such a manner as to provide inwardly indirected tips in a common plane, said slow-wave structure positioned with said planar portion parallel to said electrodes and outside the interaction region and said inwardly directed tips extending into the interaction region, electron gun means for forming and directing a stream of electrons down the interaction region at a velocity greater than the velocity of propagation of a component of the electromagnetic wave, means providing a magnetic field having lines of force in a direction parallel to the plane of said reference and collector electrodes and perpendicular to the direction of travel of the electron stream, separate input electrical conductors connected to said collector electrode and said reference electrode to establish the potential of said electrodes at different levels to produce an electric field having lines of force extending from said reference electrode to said collector electrode and substantially perpendicular to the path of said electron beam and to the lines of force of said magnetic field, and output energy coupling means connected to said slow-wave structure to receive radio frequency energy therefrom.

14. A high frequency energy interchange device of the type which depends upon an interchange of energy between charged particles and electromagnetic waves in a region of mutually perpendicular electric and magnetic fields comprising means to provide at least two parallel charged particle streams, a reference electrode and an electron collector electrode on the opposite side of each of the streams and in parallel relation to define an interaction region therebetween, an electric field shaping edge portion extending perpendicular to said reference electrode toward the interaction region and extending the length of the interaction region on each side of each charged particle stream, a slow-wave transmission line for each charged particle stream, each transmission line having substantially planar portions on opposite sides of its associated charged particle stream occupying a plane parallel to said electrodes and extending in toward said stream, means for establishing a steady electric field having lines of force extending between reference and collector electrodes, and means for providing a magnetic field in the region of the charged particle streams having lines of force extending substantially parallel to the plane of said electrodes and perpendicular both to the direction of travel of the electron streams and the lines of force produced by the electric field.

References Cited in the file of this patent

UNITED STATES PATENTS

| | | |
|---|---|---|
| 2,687,777 | Warnecke et al. | Aug. 31, 1954 |
| 2,768,328 | Pierce | Oct. 23, 1956 |
| 2,827,588 | Guenard et al. | Mar. 18, 1958 |
| 2,844,797 | Dench | July 22, 1958 |
| 2,849,643 | Mourier | Aug. 26, 1958 |